United States Patent [19]

Vounckx

[11] Patent Number: 5,035,479
[45] Date of Patent: Jul. 30, 1991

[54] DEVICE FOR OPTICAL SIGNAL PROCESSING SHOWING TRANSISTOR OPERATION

[75] Inventor: Roger A. Vounckx, Brussel, Belgium

[73] Assignee: Interuniversitair Micro-Elektronica Centrum vzw, Leuven-Heverlee, Belgium

[21] Appl. No.: 469,591

[22] PCT Filed: Jun. 19, 1989

[86] PCT No.: PCT/EP89/00693
§ 371 Date: Apr. 4, 1990
§ 102(e) Date: Apr. 4, 1990

[87] PCT Pub. No.: WO89/12843
PCT Pub. Date: Dec. 28, 1989

[30] Foreign Application Priority Data

Jun. 17, 1988 [NL] Netherlands .......................... 8801561

[51] Int. Cl.⁵ .............................................. G02B 6/10
[52] U.S. Cl. .............................. 350/96.14; 350/96.13; 357/22
[58] Field of Search .......................... 357/22 A, 30 PF; 350/96.11, 96.12, 96.13, 96.14, 96.34

[56] References Cited

U.S. PATENT DOCUMENTS

| 4,211,488 | 7/1980 | Kleinknecht | 356/369 |
| 4,721,983 | 1/1988 | Frazier | 357/4 |
| 4,784,451 | 11/1988 | Nakamura et al. | 350/96.14 |

FOREIGN PATENT DOCUMENTS

| 258530 | 3/1988 | European Pat. Off. | 357/30 PF |
| 3712864 | 3/1988 | Fed. Rep. of Germany | 357/30 PF |
| 62-190779 | 8/1987 | Japan | 357/30 PF |

Primary Examiner—Frank Gonzalez
Attorney, Agent, or Firm—Philip M. Shaw, Jr.

[57] ABSTRACT

An optical device provided with a junction region for reflecting radiation to be transmitted in the device, and a gate for controlling the electron density in said junction region, is fast and simple to manufacture.

8 Claims, 3 Drawing Sheets

DEVICE FOR OPTICAL SIGNAL PROCESSING SHOWING TRANSISTOR OPERATION

BACKGROUND OF THE INVENTION

1. Field of the Invention

The present invention relates to a device for optical signal processing.

It is an object of the present invention to provide a device for optical signal processing, with which the magnitude of a flow of light or a lightbeam in semiconductor can be influenced in a simple way.

2. Description of the Background Art

Known devices for optical signal processing make use of the non-linear effect; the disadvantages thereof are the requirement of a rather high level of power or slowness. Fabry-Pérot resonators or resonators using superlattices are required for this purpose; these are difficult to integrate.

Further there is known a device showing distributed feedback transistor operation, in which a lattice is employed. This device is also based on non-linear effect.

Further the following prior art is known: Journal of Lightwave Technology, vol. LT-5, No. 9, September 1987, IEEE, J. H. Abeles et al.: "Novel single quantum well optoelectronic devices based on exciton bleaching", pages 1296–1300; Electronics Letters, Vol. 22, No. 18, Aug. 28, 1986, S. H. Lin et al.: "GaAs PIN electrooptic travelling-wave modulator at 1.3 $\mu$m", pages 934–935; Applied Physics Letters, vol. 48, No. 19, May 12, 1986, American Institute of Physics, A. Alping et al.: "Highly efficient waveguide phase modulator for integrated optoelectronics, pages 1243–1245; EP-A-0209190; Applied Physics Letters, vol. 50, No. 15, Apr. 13, 1987, T. Hiroshima: "Electric field induced refractive index changes in GaAs-Al$_x$Ga$_{1-x}$As quantum wells", pages 968–870; EP-A-0233011; Journal of Lightwave Technology, vol. LT-5, No. 10, October 1987, R. G. Walker: "High-speed electrooptic modulation in GaAs/GaAlAs waveguide devices", pages 1444–1453.

A further object of the present invention is to provide a device with which switching rates in the order of picoseconds or subpicoseconds can be achieved.

SUMMARY OF THE INVENTION

The foregoing and other objectives are achieved by the present invention of a device for optical signal processing comprising a substrate, a waveguide of doped semiconductor material on top of the substrate, the waveguide having a refractive index which is not greater than the refractive index of the substrate, and with a junction region between the waveguide and the substrate. A gate for receiving an electric potential with respect to the substrate is positioned on top of the waveguide.

The materials chosen for the substrate and the waveguide are selected such that there is a discontinuity between their conducting bands, causing electrons in the waveguide to migrate to the substrate, thereby creating a two-dimensional gas of electrons having a very high mobility in the junction region. When light is passed through the waveguide in a direction parallel to the substrate, the passage of the light can be controlled by selectively applying a voltage to the gate which causes the electron gas to be depleted in the junction region. The frequency of the light is preferably lower than the plasma frequency of the electron gas.

BRIEF DESCRIPTION OF THE DRAWINGS

Further characteristics, details and advantages of the present invention will be clear in view of the following description of preferred embodiments of the device according to the present invention, illustrated by means of a drawing, in which show.

DESCRIPTION OF THE PREFERRED EMBODIMENTS

A layer of AlGaAs:Si$_2$, e.g. having a dope of $3 \times 10^{18}$ silicon atoms per cm$^2$, is disposed on a substrate 1 of GaAs (FIG. 1), whereby a junction region 3 is created into the GaAs substrate. Due to a discontinuity existing between the conducting bands of GaAs and AlGaAs the electrons migrate from the AlGaAs material to the GaAs substrate, whereby a two-dimensional "gas" of electrons having a very high mobility (HEMT) is created into the junction region 3 of the GaAs substrate 1, bordering the AlGaAs layer. A gate 4 to be provided with a conducting terminal is disposed onto the layer or sheet AlGaAs:Si.

When no voltage is applied to gate 4, a light beam may be sent or transmitted through the channel region 2 according to arrows L (in FIG. 1 from the left side [source] to the right side [drain]), which will pass unobstructedly, as the "electron gas" 3 is a perfect mirror or reflecting surface for this light under certain circumstances. It is important herewith that the electron density in the junction region 3 is as large as possible. Further it is of importance that the plasma frequency of the electron gas is higher than the frequency of the used light. The mobility of the electrons should be high enough to prevent dissipation of the beam in the electron gas; selectively doped hetero junctions provide the solution (transistor operation or light modulating operation).

By applying a voltage to gate 4, the electron gas is depleted in the required region 3 under the gate 4 whereby the reflection properties of the junction region 3 decrease and the light magnitude from source to the drain also decreases. Accordingly a transistor operation for light is obtained through gate 4, corresponding to a field effect transistor.

Figure 1:
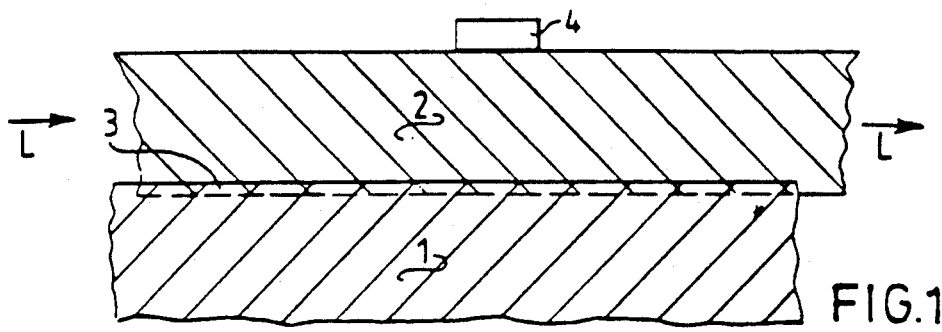
FIG. 1 a diagramatic sectional view of the structure of a first embodiment.
Figure 2:
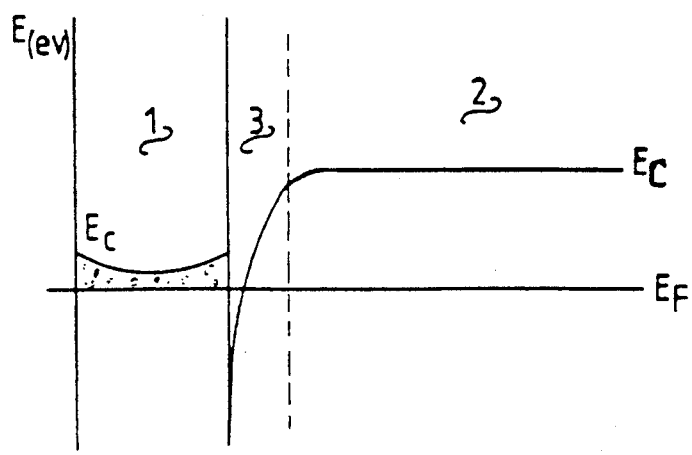
FIG. 2 a diagram of the bands of the structure from FIG. 1.

FIG. 2 shows the bands of the structure of FIG. 1, wherein $E_C$ is the level of the conduction band and $E_F$ is the Fermi level.

In a second embodiment (FIG. 3) a layer 6 e.g. of undoped $Al_{0.3}Ga_{0.7}As$ of 1-10 μm thickness (in which the dissipation of free electrons from donors is prevented) includes a doped part 7 of AlGaAs:Si (e.g. $3.10^{18}$ cm$^{-3}$) of 60 nm thickness, whereby a diagramatically depicted region 9 is created into the semiconducting GaAs substrate 8, in which the reflecting electron gas is built up.

Figure 3:
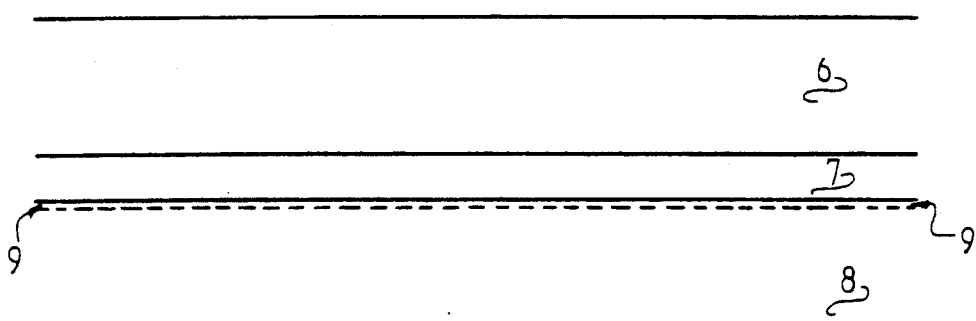
FIG. 3 a diagram of the structure according to a second preferred embodiment.
Figure 4:
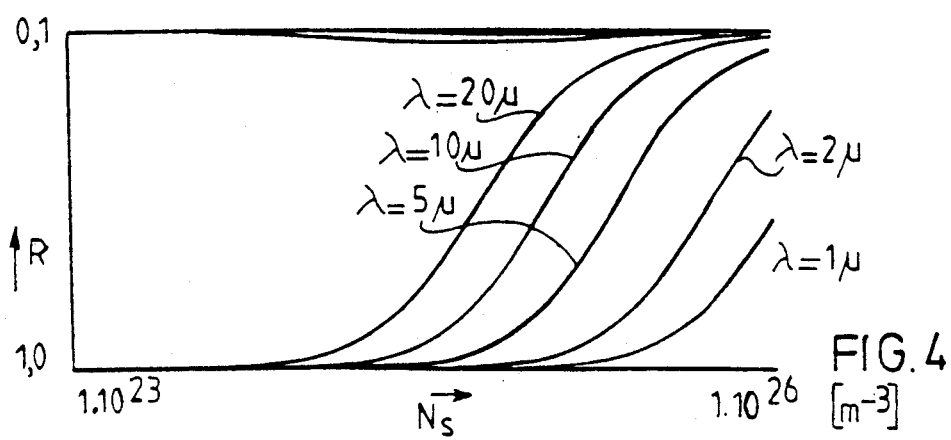
FIG. 4 a graph in which the absorption and reflection coefficients are plotted relative to the densitiy of carriers for the TE mode of the structure from FIG. 3.
Figure 5:
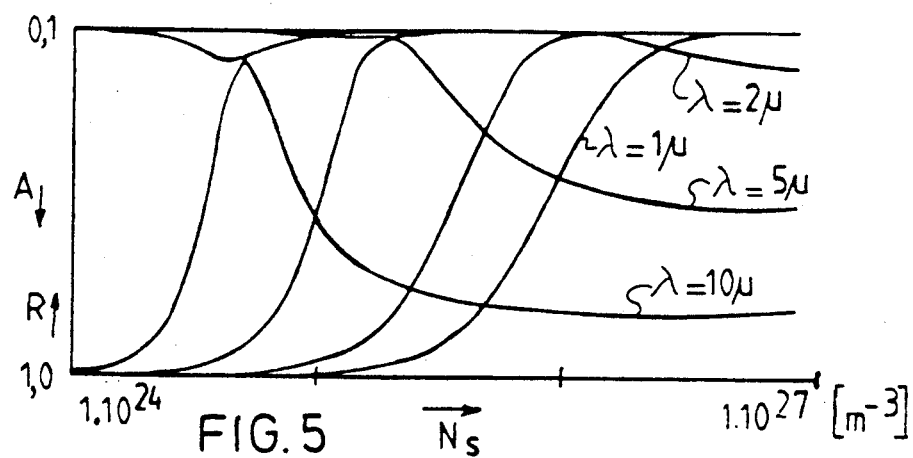
FIG. 5 a graph similar to FIG. 4 for the TM mode of the structure from FIG. 3.

When light is sent through layer 6, the structure of FIG. 3 shows an absorption and reflection coefficient as a function of different wave lengths, being different for different polarization modes of the incident light (FIG. 4: TE mode, FIG. 5: TM mode). In both graphs the curves starting at the left underside show the reflection coefficient, while the absorption coefficient is given by curves extending from the left upperside to the right upperside. The distance or interval between the reflection and absorption curves determines the transmission for the structure of FIG. 3. The curves of FIG. 4 and 5 relate to curves computed on the basis of the Maxwell equations and the plasmadynamical properties of the electron gas.

In the TE mode electron concentrations of $10^{20}$ cm$^{-3}$ are required for obtaining a sufficient high reflection at a wave length of 10 μm. For shorter wavelengths higher concentrations are required. In the TM mode a peak in the R-value of $5.10^{18}$ cm$^{-3}$ exists at 10 μm. The concentrations approach the maximum that is obtainable at a junction surface between AlGaAs and GaAs. Illumination of the complete structure by a source of the required wave length (photonenergy higher than the band gap of e.g. GaAs) will excite deep donor levels and create electron hole pairs, whereby the electron density (in the channel) increases. Therefore it becomes possible to modulate light having a lower wavelength than 10 μm.

Further semiconductors can be used, in which electrons have a smaller effective mass. Heterojunctions between e.g. CdTe and InSb of a forced layer of GaAs-GaInSb combine higher electron densities with a smaller effective electron mass; the plasma frequency and the reflection coefficient are increased; the mobility is higher; the dissipation is decreased.

Figure 6:
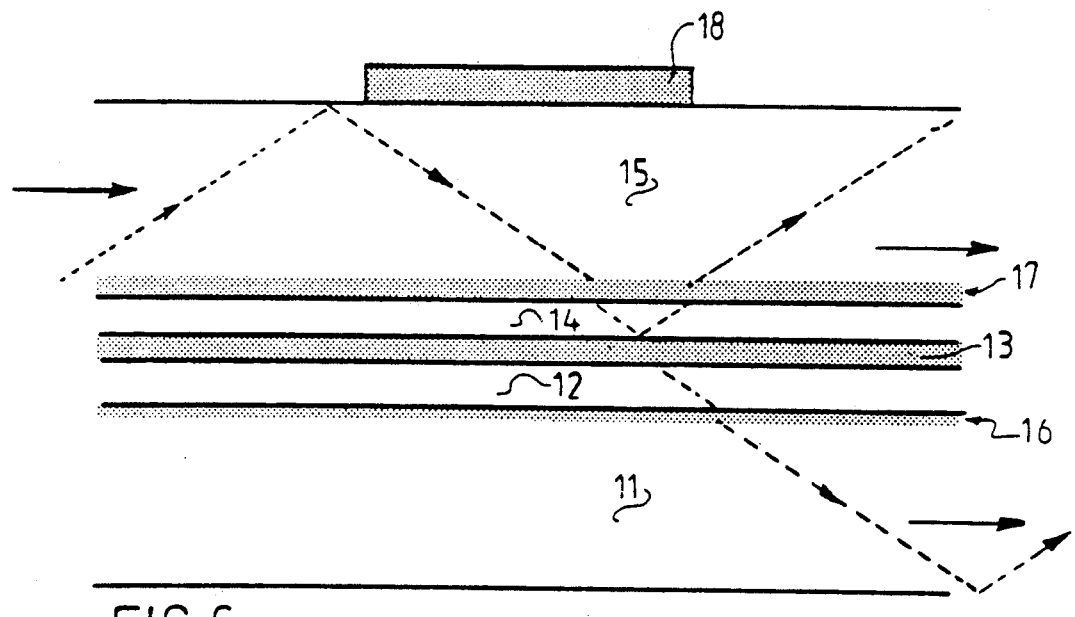
FIG. 6 a diagramatic sectional view of a third preferred embodiment of the device according to the present invention.
Figure 7:
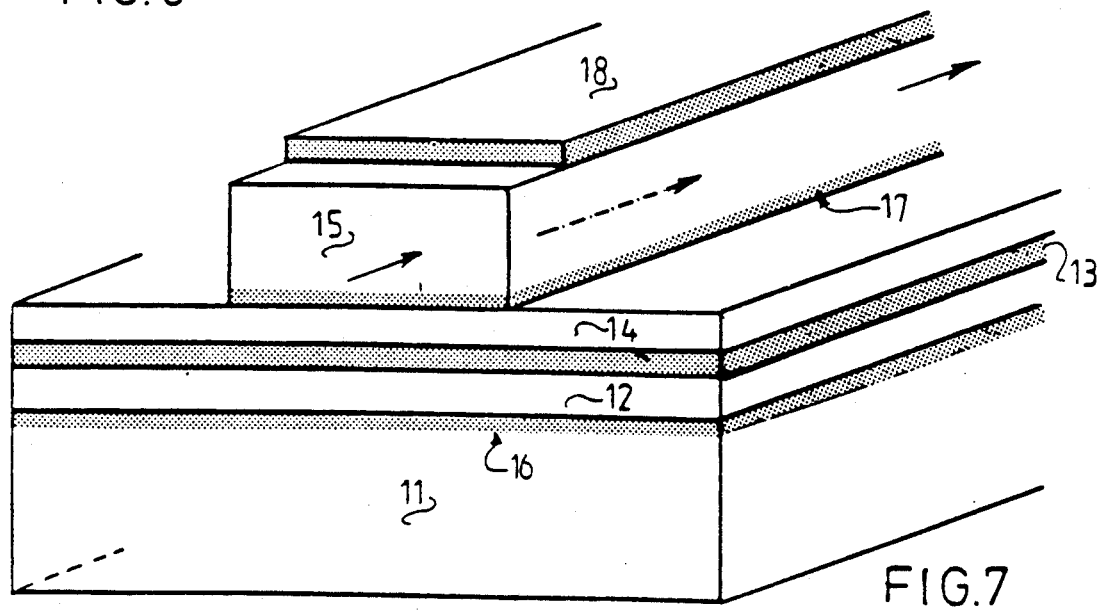
FIG. 7 a perspective view of the embodiment from FIG. 6.

A further optimized structure (FIGS. 6, 7), comprises a undoped GaAs substrate 11, a layer 12 AlAs:Si of 60 nm thickness, a layer 13 of GaAs of 30 nm thickness, a layer 14 AlAs:Si of 60 nm thickness disposed thereon and a wave guide 15 thereupon of undoped GaAs. Between layers 11 and 12 a diagrammatically shown electron gas 16 of e.g. 10 nm thickness is created, while in layer 13 an electron gas of e.g. 30 nm thickness and in the GaAs wave guide an electron gas 17 of 10 nm thickness is created. On the wave guide a control gate 18 is disposed.

Such a double hetero junction structure is descibed in the article "Physical limits of heterostructure field-effect transistors and possiblities of novel quantum field-effect devices", IEEE J. of Qua. El., vol. QE-22, nr. 9, pag. 1845-1852, 1986 of H. Sakaki. The disclosed double heterojunction structure provides a much thicker electron gas than as above described. Herewith the reflection coefficient increases and the absorption (dissipation) coefficient for the TE and TM mode (in the TM mode the reflection peak is wider, whereby the component will be less sensitive to fluctuations in electron density) decreases. By stacking a plurality of these double hetero junctions the reflection properties are increased. The modulation depth for the light is determined by the maximal thickness of a depleted layer to be created by a gate voltage; material parameters like doping and dielectrical constant have an influence thereto, e.g. at a selectively doped GaAs-AlGaAs double heterojunction ($3.10^{18}$ cm$^{-3}$), the thickness is e.g. approximately ~50 nm. At minimal gate length only one double heterojunction is used (the total thickness of the electron gas in such a structure is approximately 50 nm). When a plurality of layers is stacked upon one another and a complete modulation of the light in the channel is to be obtained, the gate length is to be increased (additional resiprositation pass of the light beam in the light guide, dependent on the number of additional double heterojunctions).

Figure 8:
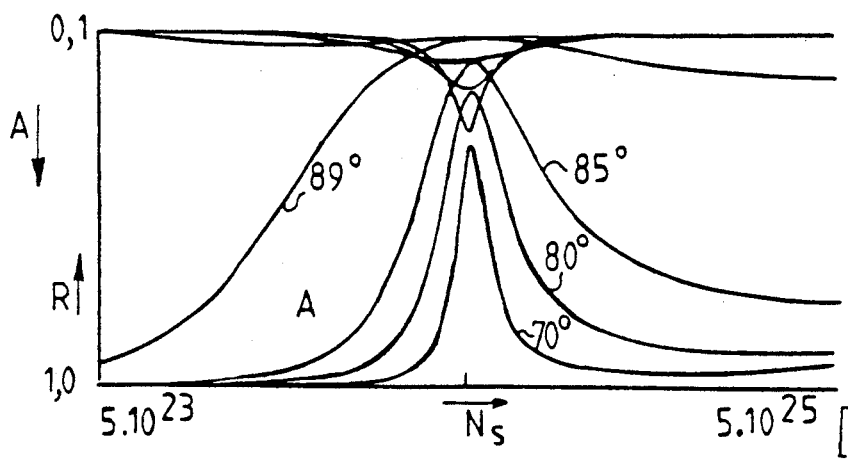
FIG. 8 a graph in which absorption and reflection coefficients are plotted as function of the density of carriers in the structure of FIG. 6, relating to different angles of incidence.

The relation between the angle of incidence and the steepness of the reflection curve (FIG. 8) offers the possibility of obtaining a transistor operation having a high "transconductance", viz. a large change in light intensity divided by the change of gate voltage, as an increase of the electron density of approximately 50% forces the device from "OFF" to "ON". In the structure shown in FIG. 4 two of the three electron gasses extend also outside the gate region. The switching rate is determined by the smallest of the two dimensions of the gate, viz. length and width. The chosen angle of incidence determined a minimum value to the gate length (e.g. for 10 μm wave length and a angle of incidents of 89° the minimal gate length is 0.5 mm); short switching times are obtained by decreasing the width. At light of a wave length of 10 μm a light wave (of GaAs) of 10 μm high and 1.5 μm wide (theoretically) may operate at a clock frequency of 100 GHz-1 THz, dependent on the chosen angle of incidence and therefore on the number of electrons to be displaced. The switching rate will be determined by the delay in the transmission line to the electrical gate.

Figure 9:
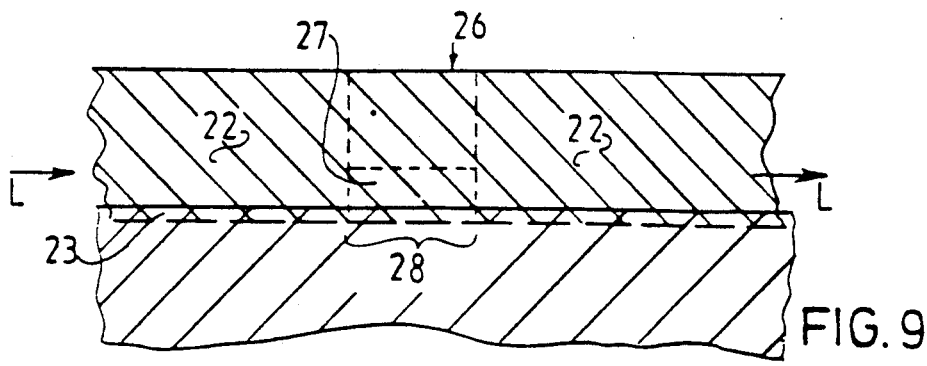
FIG. 9 a sectional view of a fourth preferred embodiment of the device according to the present invention.
Figure 10:
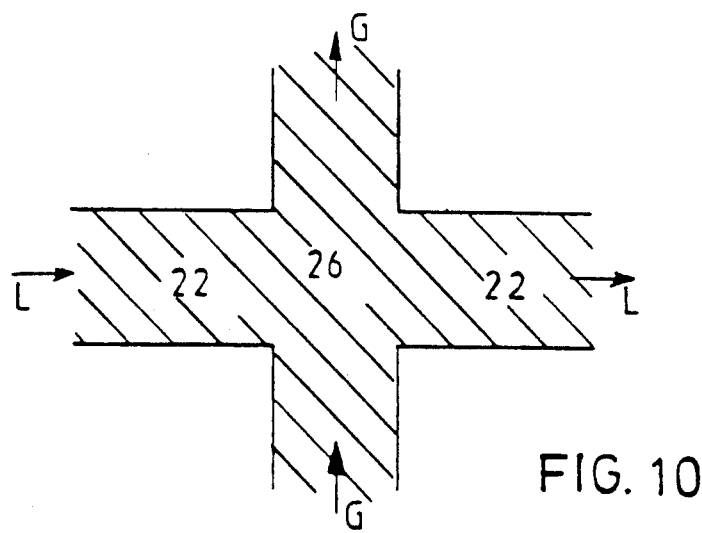
FIG. 10 a diagramatic top view of the structure from FIG. 4.

In a fourth embodiment of the present invention (FIGS. 9, 10), a channel region is provided with a gate region 26 of which a control region 27 is a part. This control region is doped with donors over a thickness of e.g. 60 nm. The first layer of e.g. 10 nm thickness from the junction region is undoped and reflects the resulting electron layer in an insufficient way due to insufficient density.

When a light beam is sent through gate region 26, a region 28 of the junction region 23 will obtain a sufficient reflection coefficient by means of this light beam, whereby the light beam serves as gate signal. It is also possible that the electron layer reflects in a sufficient way; an additional amount of electrons will be transported through the gate region by means of a light beam to the already existing electron gas, whereby the reflection diminishes in the TM mode. This second case operates in an inverting way. As is to be seen in FIG. 10, a gate light beam (arrow G) may control more than one gate region 26, when this light beam G has a sufficiently high magnitude and is coupled to a corresponding sequential gate region 26 in a not shown way.

In another possible embodiment for completely optical switching there is made use of the low value in the band in the upper conduction band of GaAs or InSb. When e.g. in GaAs a light beam of 0.31 eV wavelength or smaller is used, electrons will be transferred to the upper low value, whereby the plasma frequency is divided by a factor 8. The reflection coefficient drops hereby to a neglectable value. The relaxation time of the electrons is very short (approx. 1 psec.) such that a very fast, completely optical circuit is possible. The switching mechanism operates in an inverting way, whereby logical applications become possible.

A further, completely optical circuit is obtained by using a light beam as gate signal having a wave length similar to or smaller than the band gap wavelength of the semiconductor containing the electron gas and being perpendicularly incident light to the layer structure. As the semiconductor containing the electrons will have the smallest band gap, a gate signal of a fitting wave length will only create electron hole pairs in the reflecting part (e.g. a wave guide of undoped AlAs and a substrate of GaAs covered with e.g. an undoped AlAs buffer layer wave guide of 1 μm thickness and a buffer separated by a double heterojunction between GaAs and AlAs:Si). With the requirement of a minimum of power ($\mu W/\mu m^2$), additional electrons can thus be created in the already existing electron gas, which will switch the transistor "OFF" in the TM mode. This embodiment is also operated invertingly. As in this embodiment no electrons have to be displaced in space, but switching takes place through creation and annihilation of electron hole pairs, the switching time is only determined by the generation and recombination time of these pairs; this can be obtained in a few decades of femto seconds.

The last mentioned design is further improved by stacking a number of these heterojunctions (growing of a so-called super lattice). Herewith Bragg reflection or constructive interference will be obtained, such that the reflection coefficient for the slanting light (in the wave guide) becomes high ($\sim 1$) and less light is lost in the channel. As the gate signal (perpendicularly incident) is only absorbed in the electron gas layers it will penetrate through the complete super lattice (contrary to the embodiment having an electronic gate in which the modulation depth is determined by the Debye-length in the semi conductor) and will create electron hole pairs in the material having the small band gap. Herewith the refraction index of the material having the small bandgap is changed and therefore a deviation is created of the Bragg and/or interferance properties, whereby the reflection coefficient decreases highly.

By using semiconductors having a very small effective mass of the electrons, shorter wave lengths can be used in the channel, even the same wave length for the channel and gate signal. If e.g. a structure of InSb as electron gas carrier (e.g. a heterojunction between the above mentioned CdTe and InSb) is used a channel wave length of 2.4 μm or higher can be used according to this theory; as the band gap of InSb is only 0.17 eV (corresponding to a wave length of 7.3 μm), a completely optically switching element that may be inverting and may be connected as cascade may be made using a system based on InSb, and switched within fsec. Therefore optical information processing having a band width in the THz range (e.g. optical computers having a THz optical clock) will be achievable.

Signal processing properties to be obtained by the above device are the following:

high rates may be achieved because an electron gas is used;

using small, non-lineair effects is prevented by conducting light in material having a small refractive index;

power dissipation will be small and the described preferred embodiments will use known semiconductor techniques.

I claim:

1. A device for optical signal processing comprising:
   a substrate;
   a waveguide of doped semiconductor material on top of the substrate, the waveguide having a refractive index which is not greater than the refractive index of the substrate;
   a junction region between the waveguide and the substrate; and
   a gate for receiving an electric potential with respect to the substrate is positioned on top of the waveguide, whereby the passage of light through the waveguide in a direction parallel to the junction region is controllable by the application of an electrical potential to the gate.

2. A device for optical signal processing as recited in claim 1, wherein the materials chosen for the substrate and the waveguide are selected such that there is a discontinuity between their conducting bands, causing electrons in the waveguide to migrate to the substrate, thereby creating a two-dimensional gas of electrons having a very high mobility in the junction region.

3. A device for optical signal processing as recited in claim 2, the plasma frequency of the electron gas is preferably higher than the frequency of the light.

4. A device for optical signal processing as recited in claim 1, wherein the substrate comprises GaAs and the waveguide comprises AlGaAs:Si.

5. A device for optical signal processing as recited in claim 1, wherein the waveguide consists of non-doped GaAs, the substrate consists of GaAs, and the junction region comprises a double heterojunction structure of GaAs and AlAs:Si.

6. A device for optical signal processing as recited in claim 1, wherein the waveguide consists of non-doped AlAs, the substrate comprises a non-doped AlAs layer of 1 μm thickness and the junction region between the waveguide and the substrate comprises a double heterojunction of GaAs and AlAs:Si.

7. A device for optical signal processing as recited in claim 1, wherein the waveguide consists of non-doped SdTe, the substrate comprises CdTe and the junction region between the waveguide and the substrate comprises a double heterojunction between InSb and SdTe doped with Si.

8. A device for optical signal processing as recited in claim 1, wherein the substrate comprises undoped n-type GaAs, the waveguide undoped p-type GaAs and the junction region comprises an undoped layer of GaAs having a thickness equal to or greater than 100 nm and a doping concentration of $3.10^{18}$ cm$^{-3}$ < N-$_D$ < $1.10^{19}$ cm$^{-3}$, which is directly on top of the substrate and a barrier layer on top of the junction region of approximately 30 nm of undoped AlAs.

* * * * *